(12) United States Patent
Baek et al.

(10) Patent No.: US 10,655,553 B2
(45) Date of Patent: May 19, 2020

(54) REFORMING SYSTEM AND REFORMER MALFUNCTION DIAGNOSIS METHOD USING PRESSURE SENSOR

(71) Applicants: Hyundai Motor Company, Seoul (KR); Kia Motors Corporation, Seoul (KR)

(72) Inventors: Hong Kil Baek, Seoul (KR); Seung Woo Lee, Seoul (KR); Tae Won Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 271 days.

(21) Appl. No.: 15/653,712

(22) Filed: Jul. 19, 2017

(65) Prior Publication Data

US 2018/0135542 A1    May 17, 2018

(30) Foreign Application Priority Data

Nov. 15, 2016 (KR) .................. 10-2016-0152005

(51) Int. Cl.
 *F02D 41/00* (2006.01)
 *F02M 26/36* (2016.01)
 (Continued)

(52) U.S. Cl.
 CPC ....... *F02D 41/0052* (2013.01); *F01N 3/0814* (2013.01); *F01N 3/0842* (2013.01);
 (Continued)

(58) Field of Classification Search
 CPC .. F02D 41/0052; F02D 41/0065; F02D 41/22; F02D 19/0671; F01N 2610/02; F02M 26/36
 See application file for complete search history.

(56) References Cited

U.S. PATENT DOCUMENTS

2005/0045118 A1\* 3/2005 Wakao ................ C01B 3/38
                                                                123/3
2006/0063046 A1\* 3/2006 Hu ...................... B60W 10/06
                                                                429/414
(Continued)

FOREIGN PATENT DOCUMENTS

JP    2004-218548 A    8/2004
JP    2008-202497 A    9/2008
(Continued)

*Primary Examiner* — Chanceity N Robinson
*Assistant Examiner* — Monique M Wills
(74) *Attorney, Agent, or Firm* — Morgan, Lewis & Bockius LLP

(57) ABSTRACT

A reforming system may include an engine; an intake line connected to the engine; an exhaust line connected to the engine; a reformer provided at an exhaust gas recirculation (EGR) line diverging from the exhaust line and mixing the exhaust gas with fuel; a front end pressure sensor provided at the EGR line of the front end portion of the reformer and measuring pressure of the exhaust gas of the front end portion of the reformer; a rear end pressure sensor provided at the EGR line of the rear end portion of the reformer and measuring pressure of the exhaust gas of the rear end portion of the reformer; and a reforming controller configured for determining whether reforming continues on the basis of a pressure difference between the front end portion and the rear end portion of the reformer measured by the front end and the rear end sensors.

10 Claims, 3 Drawing Sheets

(51) Int. Cl.
*F02M 26/49* (2016.01)
*F02D 41/22* (2006.01)
*F02D 19/06* (2006.01)
*F02M 26/47* (2016.01)
*F01N 3/08* (2006.01)
*F02M 26/22* (2016.01)
*F01N 3/20* (2006.01)

(52) U.S. Cl.
CPC ....... *F01N 3/2066* (2013.01); *F02D 19/0671* (2013.01); *F02D 41/0025* (2013.01); *F02D 41/0055* (2013.01); *F02D 41/22* (2013.01); *F02M 26/22* (2016.02); *F02M 26/36* (2016.02); *F02M 26/47* (2016.02); *F02M 26/49* (2016.02); *F01N 2240/30* (2013.01); *F01N 2560/08* (2013.01); *F01N 2560/14* (2013.01); *F01N 2610/02* (2013.01); *F02D 41/0065* (2013.01); *Y02T 10/36* (2013.01); *Y02T 10/40* (2013.01)

(56) References Cited

U.S. PATENT DOCUMENTS

| | | | |
|---|---|---|---|
| 2008/0314022 | A1 | 12/2008 | Reuter et al. |
| 2011/0137537 | A1 | 6/2011 | Leone |
| 2012/0210700 | A1* | 8/2012 | Sisken ................. F01N 3/2066 60/277 |
| 2012/0291424 | A1 | 11/2012 | Inuzuka et al. |
| 2014/0369890 | A1 | 12/2014 | Hirabayashi et al. |
| 2018/0030907 | A1* | 2/2018 | Bhosekar ............. F02D 19/022 |

FOREIGN PATENT DOCUMENTS

| | | |
|---|---|---|
| JP | 2009-019515 A | 1/2009 |
| JP | 2009-097422 A | 5/2009 |
| JP | 2010-530494 A | 9/2010 |
| JP | 2012-241608 A | 12/2012 |

* cited by examiner

REFORMING SYSTEM AND REFORMER MALFUNCTION DIAGNOSIS METHOD USING PRESSURE SENSOR

CROSS-REFERENCE(S) TO RELATED APPLICATIONS

The present application claims priority to Korean Patent Application No. 10-2016-0152005 filed on Nov. 15, 2016, the entire contents of which are incorporated herein for all purposes by this reference.

BACKGROUND OF THE INVENTION

Field of the Invention

The present invention relates to a reforming system and reformer malfunction diagnosis method. More particularly, the present invention relates to a reforming system that monitors whether or not reforming is operationally normal using the pressure difference between front and rear end portions of the reformer, and a reformer malfunction diagnosis method.

Description of Related Art

Generally, an exhaust gas recirculation (EGR) system is a system which is disposed in a vehicle for decreasing noxious exhaust gas.

Exhaust gas recirculation systems are configured to reduce oxygen amount in a mixer by circulating a part of the exhaust gas expelled from the engine, reduces emissions, and reduces toxic materials in the exhaust gas.

Also, the exhaust gas expelled from the engine has high temperature, therefore the engine efficiency may be improved by utilizing the thermal energy of the exhaust gas.

Meanwhile, a fuel reformer is a device which changes fuel characteristics using a catalyst. A fuel reformer may be applied for increasing combustion efficiency or activating of post processing system.

To confirm whether or not the fuel reformer operates normally, hydrogen and carbon monoxide gas generated from the fuel reformer have to be measured by a high cost gas analyzer. The high cost gas analyzer does not have mass productivity and cannot confirm whether or not the fuel reformer operates normally in real time, therefore, it is uneconomic.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a reforming system and reformer malfunction diagnosis method that may confirm whether or not the reformer operates normally in real time and stops fuel injection of the reformer in a case of abnormal operation.

A reforming system according to an exemplary embodiment of the present invention includes an engine combusting reformed gas to generate mechanical power; an intake line connected to the engine to supply reformed gas and air to the engine; an exhaust line connected to the engine to circulate exhaust gas expelled from the engine; a reformer provided at an exhaust gas recirculation (EGR) line diverging from the exhaust line and mixing the exhaust gas with fuel to reform the fuel mixed with the exhaust gas; a front end pressure sensor provided at the EGR line of the front end portion of the reformer configured to measure the pressure of the exhaust gas of the front end portion of the reformer; a rear end pressure sensor provided at the EGR line of the rear end portion of the reformer and configured to measure the pressure of the exhaust gas of the rear end portion of the reformer; and a reforming controller configured to determine whether or not reforming continues on the basis of a pressure difference between the front end portion and the rear end portion of the reformer as measured by the front end portion and the rear end portion sensors.

The reforming system according to an exemplary embodiment of the present invention may further include a compressor connected to the intake line configured to compress the reformed gas and air supplied to the engine; and a turbine connected to the exhaust line configured to be rotated by the exhaust gas to generate power.

The reforming system according to an exemplary embodiment of the present invention may further include a catalyst disposed at the exhaust line of rear portion of the EGR line which purifies the nitrogen oxide included in the exhaust gas.

The catalyst may include a lean $NO_x$ trap (LNT) which traps the nitrogen oxide included in the exhaust gas in a lean condition and desorbs the trapped nitrogen in a rich condition, as well as restoring the nitrogen oxide included in the exhaust gas or the desorbed nitrogen oxide.

The catalyst may include a selective catalytic reducer (SCR) restoring the nitrogen oxide included in the exhaust gas using reducing agent.

At the EGR line, an EGR cooler configured to cool the reformed gas and an EGR valve disposed at a rear end portion of the EGR cooler and adjusting flow rate of the reformed gas may be disposed.

The reformer may be disposed at a front portion of the EGR cooler in the EGR line.

The rear end pressure sensor may be disposed between the reformer and the EGR cooler.

The reforming controller may continue operation of the reformer when a value obtained by subtracting the pressure of the front end portion of the reformer from the pressure of the rear end portion of the reformer exceeds a value obtained by subtracting the pressure of the front end portion of the reformer from the pressure of the rear end portion of the reformer before starting reforming, and stop operation of the reformer and fuel injection of the reformer when a value obtained by subtracting the pressure of the front end portion of the reformer from the pressure of the rear end portion of the reformer is equal to or less than a value obtained by subtracting the pressure of the front end portion of the reformer from the pressure of the rear end portion of the reformer before starting reforming.

The reforming system according to an exemplary embodiment of the present invention may further include a reformer malfunction warning lamp generating a warning alarm when a value obtained by subtracting the pressure of the front end portion of the reformer from the pressure of the rear end portion of the reformer is equal to or less than a value obtained by subtracting the pressure of the front end portion of the reformer from the pressure of the rear end portion of the reformer before starting reforming.

The driving condition of the engine may be revolutions per minute (RPM) of the engine and engine torque.

Meanwhile, a reformer malfunction diagnosis method according to an exemplary embodiment of the present invention includes detecting a driving condition of an engine; operating the reformer; measuring respective pressure of the front and rear end portions of the reformer from pressure sensors of the front and rear end portion of the reformer; determining a difference between the pressures of the front and rear end portions of the reformer and comparing the difference with a difference between the pressures of the front and rear end portions of the reformer before starting reforming; stopping fuel injection of the reformer when a value obtained by subtracting the pressure of the front end portion of the reformer from the pressure of the rear end portion of the reformer is equal to or less than a value obtained by subtracting the pressure of the front end portion of the reformer from the pressure of the rear end portion of the reformer before starting reforming; and generating a warning alarm from a reformer malfunction warning lamp.

The reformer malfunction diagnosis method according to an exemplary embodiment of the present invention may further include continuous operation of the reformer when a value obtained by subtracting the pressure of the front end portion of the reformer from the pressure of the rear end portion of the reformer exceeds a value obtained by subtracting the pressure of the front end portion of the reformer from the pressure of the front end portion of the reformer before starting reforming.

According to an exemplary embodiment of the present invention, whether or not the reformer operates normally may be monitored by measuring pressure of the front and rear end portions of the fuel reformer.

Also, fuel consumption deterioration may be prevented and catalyst of the reformer may be protected by stopping operation of the fuel reformer through diagnosing fuel reformer malfunction.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
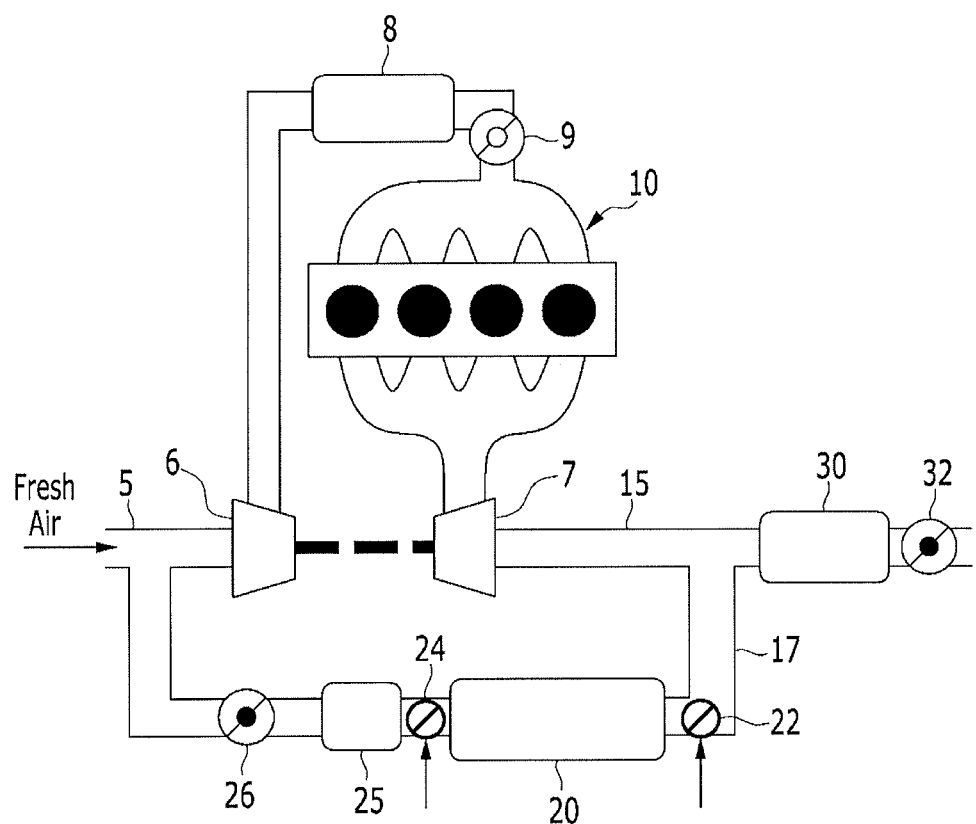
FIG. 1 is a schematic view illustrating a reforming system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will be understood that when an element including a layer, film, region, or substrate is referred to as being "on" another element, it can be directly on the other element or intervening elements may also be present.

A reforming system according to an exemplary embodiment of the present invention will now be described with reference to FIG. 1.

FIG. 1 is a schematic view illustrating a reforming system according to an exemplary embodiment of the present invention.

Referring to FIG. 1, a reforming system includes an engine 10, an intake line 5, an exhaust line 15, a reformer 20, a front end pressure sensor 22, a rear end pressure sensor 24, and a reforming controller.

The engine 10 burns an air and fuel mixture to convert chemical energy into mechanical energy. The engine 10 is connected to an intake manifold to receive the air in a combustion chamber, and is connected to an exhaust manifold wherein exhaust gas generated in the combustion process is gathered in the exhaust manifold and is expelled to the external. An injector is mounted in the combustion chamber to inject the fuel into the combustion chamber.

A diesel engine is exemplified herein, but a lean-burn gasoline engine may be used. In a case that the gasoline engine is used, the air and fuel mixture flows into the combustion chamber through the intake manifold, and a spark plug is mounted at an upper portion of the combustion chamber. In a case that the gasoline engine is used, the air and fuel mixture flows into the combustion chamber through the intake manifold, and a spark plug is mounted at an upper portion of the combustion chamber.

In addition, engines having various compression ratios, preferably a compression ratio equal to or less than 16.5, may be used.

The intake line 5 is connected to entrance of the engine 10 to supply reformed gas and air to the engine 10, and the exhaust line 15 is connected to the exit of the engine 10 to circulate exhaust gas expelled from the engine 10.

A portion of the exhaust gas expelled from the engine 10 is resupplied to the engine 10 through the EGR line 17. Also, the EGR line 17 is connected to the intake manifold so that the combustion temperature is controlled by mixing a portion of the exhaust gas with air. The present combustion temperature control is conducted by adjusting the exhaust gas amount supplied to the intake manifold. Accordingly, EGR valve 26 which is configured to adjust the flow rate of the reformed gas may be disposed at the EGR line 17.

An exhaust gas recirculation system realized by the EGR line 17 supplies a portion of the exhaust gas to the intake system and inflows to the combustion chamber when the exhaust amount of the nitrogen oxide needs to be reduced according to a driving condition. Then, the exhaust gas, which is inert gas whose volume is not changed, depresses the density of the air and fuel mixture, and the flame transmitting speed is reduced during combustion of the fuel. Therefore, the combustion velocity of the fuel is reduced and escalation of the combustion temperature is reduced to retard generation of the nitrogen oxide.

The reformer 20 is disposed at the EGR line 17 diverging from the exhaust line 15 and mixes the exhaust gas with fuel to reform the fuel mixed with the exhaust gas.

The reformer 20 may include an inlet where the exhaust gas inflows, a mixing portion where the exhaust gas and fuel are mixed, a reforming portion where fuel is reformed, and an outlet where the reformed gas outflows.

The front end pressure sensor 22 is provided at the EGR line 17 of the front end portion of the reformer 20 and may measure the pressure of the exhaust gas of the front end portion of the reformer 20.

The rear end pressure sensor 24 is provided at the EGR line 17 of the rear end portion of the reformer 20 and may measure the pressure of the exhaust gas of the rear end portion of the reformer 20.

Meanwhile, the reforming system according to an exemplary embodiment of the present invention may further include a compressor 6 connected to the intake line 5 and configured to compress the reformed gas and air to supply to the engine 10, and a turbine 7 connected to the exhaust line 15 wherein the turbine 7 is configured to be rotated by the exhaust gas to generate power.

Also, the reforming system may include an intercooler 8 connected to the compressor 6 and configured to cool air and reformed gas in-flowed into the intake line 5 of the engine 10 again, and a throttle valve 9 configured to adjust the flow rate of the air and reformed gas.

Also, the reforming system according to an exemplary embodiment of the present invention may further include a catalyst 30 disposed at the exhaust line 15 of the rear portion of the EGR line 17, configured to purify the nitrogen oxide included in the exhaust gas.

The catalyst 30 may include a lean $NO_x$ trap (LNT) which traps the nitrogen oxide included in the exhaust gas in a lean condition, desorbs the trapped nitrogen in a rich condition, and restores the nitrogen oxide included in the exhaust gas or the desorbed nitrogen oxide. The LNT may oxidize carbon monoxide (CO) and hydrocarbon (HC) included in the exhaust gas. Here, it should be understood that the hydrocarbon is used to imply compounds including carbon and hydrogen in the exhaust gas and fuel.

Also, the catalyst 30 may include a selective catalytic reducer (SCR) restoring the nitrogen oxide included in the exhaust gas using a reducing agent. The reducing agent may be urea injected from an injection module.

An exhaust pressure control valve 32 adjusting the flow rate of the exhaust gas may be provided at a rear end portion of the catalyst 30 in the exhaust line 15.

Meanwhile, at the EGR line 17, an EGR cooler 25 cooling the reformed gas and an EGR valve 26 disposed at a rear end portion of the EGR cooler 25 and adjusting flow rate of the reformed gas may be disposed.

At the present time, the reformer 20 may be disposed at a front portion of the EGR cooler 25 in the EGR line 17, and the rear end pressure sensor 24 may be disposed between the reformer 20 and the EGR cooler 25.

Meanwhile, the reforming controller is configured to determine whether or not reforming continues on the basis of a pressure difference between the front end portion and the rear end portion of the reformer 20 measured by the front end portion and the rear end portion sensors 22 and 24.

The reforming controller continues operation of the reformer 20 when a value obtained by subtracting the pressure of the front end portion of the reformer 20 from the pressure of the rear end portion of the reformer 20 exceeds a value obtained by subtracting the pressure of the front end portion of the reformer 20 from the pressure of the rear end portion of the reformer 20 before starting reforming. Also, the reforming controller stops operation of the reformer 20 and fuel injection of the reformer when a value obtained by subtracting the pressure of the front end portion of the reformer 20 from the pressure of the rear end portion of the reformer 20 is equal to or less than a value obtained by subtracting the pressure of the front end portion of the reformer 20 from the pressure of the rear end portion of the reformer 20 before starting reforming.

Also, the reforming system according to an exemplary embodiment of the present invention may further include a reformer malfunction warning lamp configured to generate a warning alarm when a value obtained by subtracting the pressure of the front end portion of the reformer 20 from the pressure of the rear end portion of the reformer 20 is equal to or less than a value obtained by subtracting the pressure of the front end portion of the reformer 20 from the pressure of the rear end portion of the reformer 20 before starting reforming.

Figure 2:
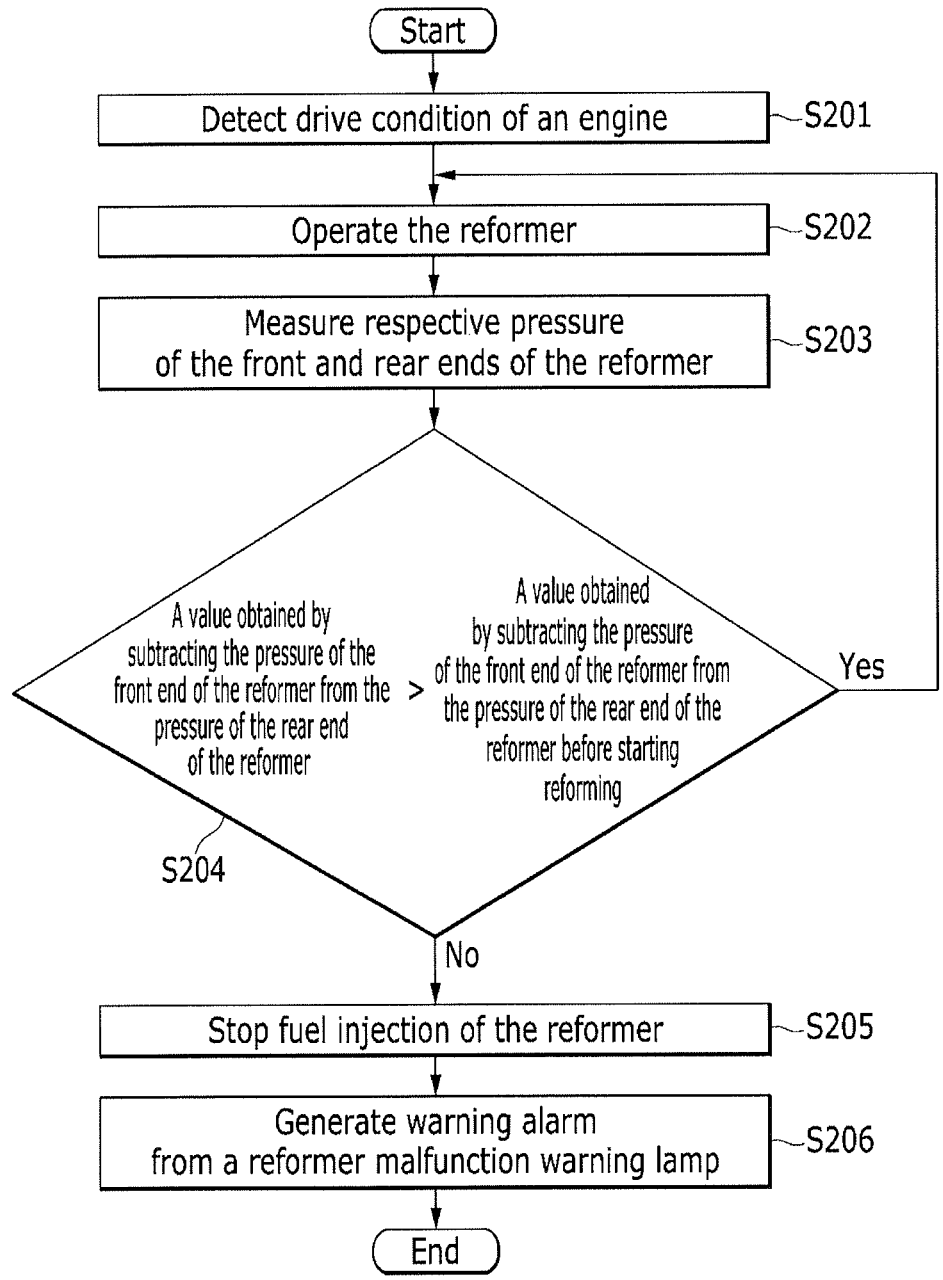
FIG. 2 is a flowchart illustrating a reformer malfunction diagnosis method according to an exemplary embodiment of the present invention.
Figure 3:
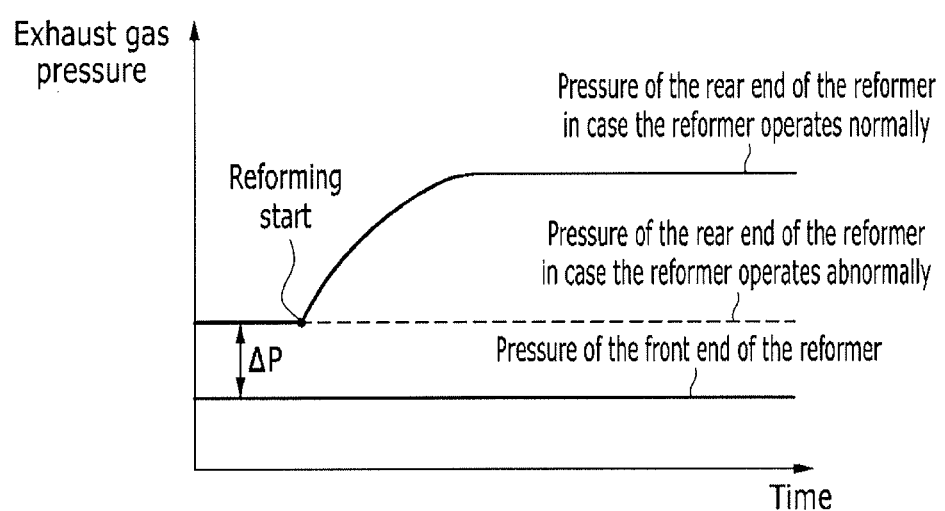
FIG. 3 is a graph illustrating whether or not the reformer operates normally according to pressure of the front and rear end portions of the reformer according to an exemplary embodiment of the present invention.

FIG. 2 is a flowchart illustrating a reformer malfunction diagnosis method according to an exemplary embodiment of the present invention, and FIG. 3 is a graph illustrating whether or not the reformer operates normally according to pressure of the front and rear end portions of the reformer according to an exemplary embodiment of the present invention.

Referring to FIG. 2, the reformer malfunction diagnosis method, firstly a driving condition of an engine is detected (S201). The driving condition of the engine may be the revolutions per minute (RPM) of the engine, engine torque, idle state, normal speed, reduced speed, and accelerated speed state etc.

After that, the reformer operates so that mixed gas of the exhaust gas circulated in the engine, and the EGR line and fuel injected into the reformer is reformed (S202).

Then, pressure of the front end portion of the reformer is measured from the front end portion pressure sensor, and pressure of the rear end portion of the reformer is measured from the rear end pressure sensor (S203).

After that, a difference between the pressures of the front and rear end portions of the reformer is determined and the difference is compared with a difference between the pressures of the front and rear end portions of the reformer before starting reforming (S204).

At the present time, when a value obtained by subtracting the pressure of the front end portion of the reformer from the pressure of the rear end portion of the reformer is equal to or less than a value obtained by subtracting the pressure of the front end portion of the reformer from the pressure of the rear end portion of the reformer before starting reforming, fuel injection of the reformer stops (S205).

Then, a warning alarm is generated from a reformer malfunction warning lamp (S206).

When a value obtained by subtracting the pressure of the front end portion of the reformer from the pressure of the rear end portion of the reformer exceeds a value obtained by subtracting the pressure of the front end portion of the reformer from the pressure of the rear end portion of the reformer before starting reforming, operation of the reformer continues.

Referring to FIG. 3, exhaust gas pressure measured from the front end pressure sensor 22 is constant, and exhaust gas pressure measured from the rear end pressure sensor 24 is variable.

When the reformer 20 operates normally, since the exhaust gas pressure increases after starting reforming, a value obtained by subtracting the pressure of the front end portion of the reformer 20 from the pressure of the rear end portion of the reformer 20 exceeds a value ΔP obtained by subtracting the pressure of the front end portion of the reformer 20 from the pressure of the rear end portion of the reformer 20 before starting reforming.

Accordingly, when it is determined that the reformer 20 operates normally, operation of the reformer 20 continues.

However, when the reformer 20 operates abnormally or does not operate, since the pressure of the reformed gas after reforming is equal to or less than the pressure of the exhaust gas before reforming, a value obtained by subtracting the pressure of the exhaust gas of the front end portion of the reformer 20 from the pressure of the reformed gas of the rear end portion of the reformer 20 is equal to or smaller than a value ΔP obtained by subtracting the pressure of the front end portion of the reformer 20 from the pressure of the rear end portion of the reformer 20.

Accordingly, when it is determined that the reformer 20 is malfunctioning, operation of the reformer 20 stops and fuel injection of the reformer 20 stops. Also, a warning alarm is generated from a reformer malfunction warning lamp.

Like the above case, according to an exemplary embodiment of the present invention, it may be monitored whether or not the reformer operates normally by measuring pressure of the front and rear end portions of the fuel reformer.

Also, fuel consumption deterioration may be prevented and catalyst of the reformer may be protected by stopping operation of the fuel reformer through diagnosing fuel reformer malfunction.

For convenience in explanation and accurate definition in the appended claims, the terms "upper", "lower", "internal", "outer", "up", "down", "upwards", "downwards", "front", "back", "rear", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereto. It is intended that the scope of the invention be defined by the Claims appended hereto and their equivalents.

What is claimed is:

1. A reforming system, comprising:
   an engine combusting reformed gas to generate mechanical power;
   an intake line connected to the engine to supply the reformed gas and air to the engine;
   an exhaust line connected to the engine to circulate exhaust gas expelled from the engine;
   a reformer provided at an exhaust gas recirculation (EGR) line diverging from the exhaust line and mixing the exhaust gas with fuel to reform the fuel mixed with the exhaust gas;
   a front end pressure sensor provided at the EGR line of a front end portion of the reformer and measuring pressure of the exhaust gas of the front end portion of the reformer;
   a rear end pressure sensor provided at the EGR line of a rear end portion of the reformer and measuring pressure of the exhaust gas of the rear end portion of the reformer; and
   a reforming controller configured for determining whether reforming continues on a basis of a pressure difference between the front end portion and the rear end portion of the reformer measured by the front end and the rear end sensors,
   wherein the reforming controller is configured to continue operation of the reformer when the pressure difference obtained by subtracting the pressure of the exhaust gas in the front end portion of the reformer from the pressure of the exhaust gas in the rear end portion of the reformer exceeds a value obtained by subtracting a pressure of the exhaust gas in the front end portion of the reformer from a pressure of the exhaust gas in the rear end portion of the reformer before starting reforming, and stops operation of the reformer and fuel injection of the reformer when the pressure difference obtained by subtracting the pressure of the exhaust gas in the front end portion of the reformer from the pressure of the exhaust gas in the rear end portion of the reformer is equal to or less than the value obtained by subtracting the pressure of the exhaust gas in the front end portion of the reformer from the pressure of the exhaust gas in the rear end portion of the reformer before starting reforming.

2. The reforming system of claim 1, further including:
   a compressor connected to the intake line and compressing the reformed gas and air to supply to the engine; and
   a turbine connected to the exhaust line and rotating by the exhaust gas to generate power.

3. The reforming system of claim 1, further including:
   a catalyst disposed in the exhaust line of a rear portion of the EGR line and purifying a nitrogen oxide included in the exhaust gas.

4. The reforming system of claim 3, wherein the catalyst includes a lean $NO_x$ trap (LNT) which traps the nitrogen oxide included in the exhaust gas in a lean condition and desorbs the trapped nitrogen in a rich condition, and restores the nitrogen oxide included in the exhaust gas or the desorbed nitrogen oxide.

5. The reforming system of claim 3, wherein the catalyst includes a selective catalytic reducer (SCR) restoring the nitrogen oxide included in the exhaust gas by use of a reducing agent.

6. The reforming system of claim 1, wherein at the EGR line, an EGR cooler cooling the reformed gas, and an EGR valve disposed at a rear end portion of the EGR cooler and adjusting a flow rate of the reformed gas are disposed.

7. The reforming system of claim 6, wherein the reformer is disposed at a front portion of the EGR cooler in the EGR line.

8. The reforming system of claim 7, wherein the rear end pressure sensor is disposed between the reformer and the EGR cooler.

9. The reforming system of claim 1, further including:
   a reformer malfunction warning lamp generating warning alarm when the pressure difference obtained by subtracting the pressure of the exhaust gas in the front end portion of the reformer from the pressure of the exhaust gas in the rear end portion of the reformer is equal to or less than the value obtained by subtracting the pressure of the exhaust gas in the front end portion of the reformer from the pressure of the exhaust gas in the rear end portion of the reformer before starting reforming.

10. The reforming system of claim 1, wherein a driving condition of the engine is revolutions per minute (RPM) of the engine and an engine torque.

* * * * *